US005649255A

United States Patent [19]

Schieltz

[11] Patent Number: 5,649,255

[45] Date of Patent: Jul. 15, 1997

[54] VIDEO SURVEILLANCE CAMERA RELEASE AND REMOVAL MECHANISM

[75] Inventor: Steven W. Schieltz, Boca Raton, Fla.

[73] Assignee: Sensormatic Electronics Corporation, Deerfield Beach, Fla.

[21] Appl. No.: 533,081

[22] Filed: Sep. 25, 1995

[51] Int. Cl.$^6$ .................... G03B 29/00

[52] U.S. Cl. .................... 396/427; 396/429; 81/53.1; 294/19.1; 348/143

[58] Field of Search .......... 354/81, 293; 348/143–156; 352/242, 243; 81/53.1, 53.11, 53.12; 294/19.1; 396/427, 429

[56] References Cited

U.S. PATENT DOCUMENTS

| | | | |
|---|---|---|---|
| 2,016,078 | 10/1935 | Demyttenaere | 81/53.11 |
| 2,032,689 | 3/1936 | Demyttenaere et al. | 81/53.11 |
| 3,819,856 | 6/1974 | Pearl et al. | 348/151 |
| 4,320,949 | 3/1982 | Pagano | 354/81 |
| 4,833,534 | 5/1989 | Paff et al. | 358/108 |
| 4,934,089 | 6/1990 | Samar | 294/19.1 |
| 4,945,367 | 7/1990 | Blackshear | 354/81 |
| 5,121,215 | 6/1992 | Boers et al. | 348/151 |
| 5,223,872 | 6/1993 | Stiepel et al. | 354/81 |
| 5,240,220 | 8/1993 | Elberbaum | 348/151 |
| 5,317,939 | 6/1994 | Marinescu | 81/53.11 |
| 5,394,209 | 2/1995 | Stiepel et al. | 354/81 |

*Primary Examiner*—A. A. Mathews
*Attorney, Agent, or Firm*—Robin, Blecker, Daley & Driscoll

[57] ABSTRACT

A surveillance camera assembly housing is releasably locked to a base for the housing. The base is installed in a ceiling or at another location remote from ground level. A removal tool provided at the end of a pole has fingers which are inserted into apertures in the assembly housing. The tool engages the assembly housing by means of the fingers, while also being operated to release a mechanism which secures the housing to the base. The housing, now secured to the tool, is removed from the base and brought to ground level. In this way, removal of the surveillance camera is accomplished without resort to ladders or scaffolding.

36 Claims, 8 Drawing Sheets

VIDEO SURVEILLANCE CAMERA RELEASE AND REMOVAL MECHANISM

FIELD OF THE INVENTION

This invention is concerned with video surveillance camera mounting assemblies and methods of installing video surveillance cameras and removing installed cameras.

BACKGROUND OF THE INVENTION

It is well known to provide mounting structures for video cameras to be installed in or near buildings to be protected by a video surveillance system. The mounting structures typically include a housing that is secured to the ceiling of the building or at another suitable location on the building. The housing contains a video camera, motors and other components which permit the camera to be moved by remote control through a range of motion, and electronics for receiving control signals and transmitting video signals generated by the camera. Frequently, a portion of the enclosure is in the shape of a dome and is formed of plastic which permits incident light to enter and be captured by the video camera. The assembly, including the housing, the camera and associated components, are together commonly referred to as a "dome", which takes its name from the dome-shaped portion of the housing.

After the initial installation of the dome, the need arises from time to time to remove the dome for purposes such as routine maintenance, repair or replacement. To that end, it is known to mount on the upper part of the dome a plurality of spring loaded rods which are releasably inserted into suitably shaped brackets secured to the ceiling or other support structure. A safety lanyard also is provided on the dome, and a free end of the lanyard is removably secured in another bracket mounted on the ceiling. Removal of the dome from the structure on which it is installed requires the individual assigned to perform the removal to be close enough to the dome so that the individual is able to reach by hand to disengage the spring-loaded bolts from the mounting brackets and to release the safety lanyard. It is common practice to install surveillance camera domes in high ceilings, or otherwise at a considerable distance from ground or floor level, both to provide satisfactory fields of view for the cameras and to deter unauthorized interference with the cameras. In such installations, removal of the camera entails climbing a considerable distance upwards on a ladder, or deploying suitable scaffolding, in order to approach the dome. Two hands are generally needed to manipulate the spring-loaded bolts so as to release the dome from the mounting brackets, and to release the safety lanyard while holding the dome, leaving the individual concerned to maintain his or her balance on the ladder without aid of hands.

It is also to be noted that dropping a dome during the removal process is likely to result in significant financial loss since domes are generally fragile and have a substantial replacement cost.

In light of the preceding discussion, it is not surprising that many operators of video surveillance systems call upon the supplier of the system to dispatch a trained employee to the operators' premises when removal of a dome is needed. The cost and inconvenience entailed by this practice is considerable, raising a need for a dome mounting system that facilitates removal and replacement of the domes.

OBJECTS AND SUMMARY OF THE INVENTION

It is accordingly an object of the invention to facilitate removal and replacement of video surveillance domes.

It is a further object of the invention to provide a system for dome replacement and removal which does not require an individual to come into close proximity with the location at which the dome is, or is to be, installed.

It is still another object of the invention to provide a dome removal and replacement system which minimizes the risk of damage to the dome.

It is still a further object of the invention to provide a dome removal and replacement technique which can be readily performed by unskilled personnel.

According to an aspect of the invention, there is provided apparatus for releasably locking a surveillance camera assembly housing to a base for the housing, including first means provided on the housing for engaging a tool used for removing the housing from the base, and second means mounted on at least one of the housing and the base for releasably securing the housing to the base.

Further in accordance with this aspect of the invention, the first means may include a plurality of apertures in the housing provided spaced apart from each other at respective positions on the housing, and the second means may include a plurality of lock members provided on the base at respective positions corresponding to the positions of the apertures on the housing. Further, the lock members may be movable by the tool from a first position in which the lock members secure the housing to the base to a second position such that the housing is at least partially released from the base. The lock members may be locking clips mounted on the base and biased downwardly toward the first position, in which case the tool acts to move the locking clips upwardly from the first position to the second position. The apertures in the housing may be formed in a top wall of the housing with the locking clips engaging the apertures when the locking clips are in their first position. Each of the apertures may include a stepped slot formed in the top wall of the housing.

Alternatively in accordance with this aspect of the invention, the tool may have a plurality of key portions, in which case the first means includes a plurality of lock barrels mounted on the housing, each for engaging a respective one of the plurality of key portions of the tool. In this case, the second means may include a plurality of latch slides, each associated with a respective one of the lock barrels for sliding movement in response to rotational movement of the respective lock barrel, and the second means may further include a plurality of latch pins mounted on the base, each for engaging a respective one of the latch slides.

According to another aspect of the invention, there is provided a method of removing a surveillance camera assembly housing from a base on which the assembly housing is lockingly mounted, the method including the steps of engaging the housing with a tool for removing the housing from the base, and releasing a locking mechanism which secures the housing to the base. The engaging and releasing steps may be performed at least partially simultaneously, and the engaging step may include inserting a portion of the tool into the housing so that the portion of the tool is engaged by an aperture provided in the housing. The releasing step may include rotating the housing relative to the base to a position in which an opening provided in the housing is aligned with a locking shelf provided on the base. Alternatively, the engaging step may include inserting a key portion provided on the tool into a lock barrel portion provided on the housing, and the releasing step may include sliding a latch slide provided on the housing so as to disengage the latch slide from a latch pin provided on the base. The method may be performed so that the housing is secured to the tool before the locking mechanism is released.

According to yet another aspect of the invention, there is provided a method of installing a surveillance camera assembly housing on a mounting base, including the steps of engaging the housing with an installation tool, lockingly mounting the housing on the mounting base by manipulating the installation tool by which the housing is engaged, and disengaging the installation tool from the housing.

Further in accordance with this aspect of the invention, the mounting step may include placing a locking mechanism provided on at least one of the housing and the base in a locked condition, and disengaging step may be prevented unless the locking mechanism is in the locked condition.

Further, the engaging step may include inserting a portion of the installation tool into the housing so that the portion of the tool is engaged by an aperture provided in the housing. Also, the mounting step may include rotating the housing relative to the base to a position in which a portion of the housing is supported on a shelf provided on the base.

Further in accordance with the latter aspect of the invention, the disengaging step may include releasing a locking catch provided on the installation tool. Alternatively, the engaging step may include inserting a key portion provided on the installation tool into a lock barrel portion provided on the housing, and the mounting step may include sliding a slide latch provided on the housing so that the slide latch engages a latch pin provided on the base.

According to still another aspect of the invention, there is provided a tool for removing a surveillance camera assembly housing from a base on which the assembly is mounted, including a pole portion, and at least one insertion portion, mounted on the pole portion and adapted for being inserted into an opening provided in the housing. The insertion portion may include a plurality of key portions adapted for being inserted into lock barrels provided on the housing. In addition, the tool may include a support member mounted on the pole portion so that the pole portion is rotatable relative to the support member, a plurality of key-holding members rotatably mounted on the support member, each of the key-holding members having a respective one of the key portions mounted thereon, and a drive member mounted for rotation with the pole portion and engaged with the key-holding members for rotatively driving the key-holding members upon rotation of the pole portion relative to the support member.

Alternatively in accordance with this aspect of the invention, the tool may include a cradle adapted for being brought into contact with a convex lower surface of the camera assembly housing and being mounted on the pole portion for movement relative to the pole portion in a direction parallel to a longitudinal axis of the pole portion, and a link mechanism for linking the cradle to the at least one insertion portion so that the at least one insertion portion is moved in a direction substantially orthogonal to the longitudinal axis of the pole portion in response to the movement by the cradle in a direction parallel to the longitudinal axis of the pole portion.

As another alternative, the pole portion may have an open end and a second end opposite the open end, and be hollow from the open end along at least part of a length extent of the pole portion, and the at least one insertion portion may include a plurality of L-shaped members each including a horizontal part and a vertical part substantially longer than the horizontal part, with the pole portion further including an inner pole mounted in the hollow part of the pole portion for movement relative to the pole portion in a direction parallel to the longitudinal axis of the pole portion, the inner pole extending outwardly from the open end of the pole portion and having a first end located outboard from the open end of the pole portion, a mechanism for biasing the inner pole in a direction from the second end to the open end of the pole portion, a cradle mounted on the first end of the pole portion and having a concave shape adapted for supportingly contacting a convex lower surface of the camera assembly housing, a cross-bar on the inner pole intermediate the cradle and open end of the pole portion and having opposite ends each pivotally linked to the vertical part of a respective one of the plurality of L-shaped members, and a plurality of link members each having a first end pivotally linked to the pole portion and a second end pivotally linked to the vertical part of a respective one of the plurality of L-shaped members. Also, the pole portion may include a latch mechanism for selectively locking the inner pole to the pole portion.

Further in accordance with this aspect of the invention, the pole portion may include a telescoping part and a head part selectively mountable on the telescoping part, with the at least one insertion portion being mounted on the head part. The telescoping part may be selectively extendable to a length in excess of ten feet.

DESCRIPTION OF PREFERRED EMBODIMENTS

FIRST EMBODIMENT

A first embodiment of the invention will now be described, initially with reference to FIG. 1.

Figure 1:
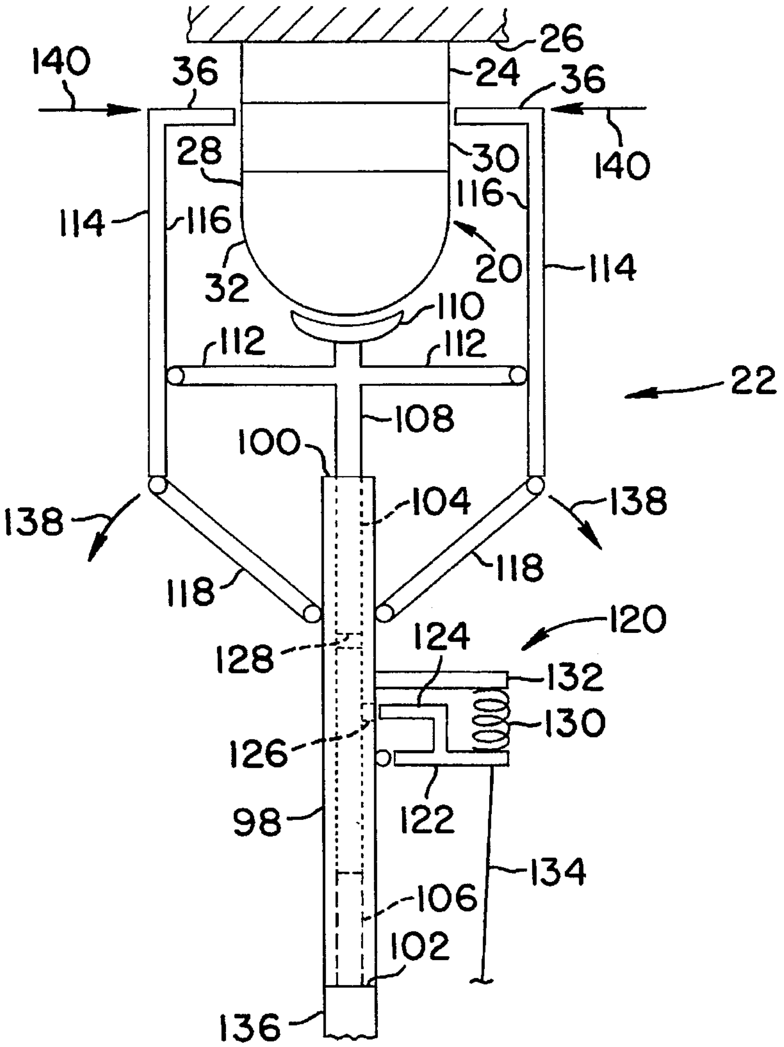
FIG. 1 is a semi-schematic front view of a surveillance camera assembly provided in accordance with the invention and a removal tool provided in accordance with the invention for removing a portion of the assembly from its fixedly mounted base.

In FIG. 1, reference numeral 20 generally indicates a surveillance camera assembly provided in accordance with the present invention. Also shown in FIG. 1 is a camera removal tool 22 provided in accordance with the invention. The camera assembly 20 is made up of a base portion 24 which is fixedly mounted to a ceiling 26, and a housing portion 28 which is removably mounted on the base portion 24 by means which will be described below. The housing portion 28 is made up of a cap portion 30 which is removably engaged to the base 24, and a dome portion 32 suspended from the cap portion 30.

Figure 2:
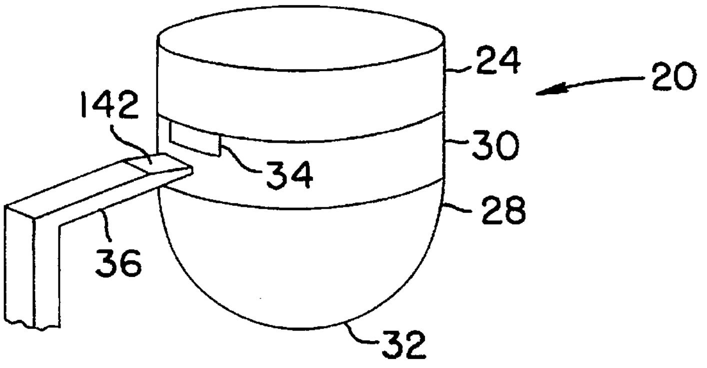
FIG. 2 is a perspective view of the assembly of FIG. 1, with an insertion finger, provided on the tool of FIG. 1, poised for insertion into the assembly.

As seen from FIG. 2, the cap portion 30 has an aperture 34 formed in an outer wall of the cap portion to permit insertion into the housing 28 of an insertion finger 36 provided on the tool 22. In a manner to be described below, upon insertion of the finger 36 into the aperture 34, the finger and the aperture come into engagement with each other so that the tool 22 may be used to remove the housing portion 28 from the base 24 by a twist-unlock operation.

Although not shown in the drawings, it is to be understood that a video camera, associated motors for operating the camera, and suitable electronic components, are all disposed within housing portion 28. Thus, removal of the housing portion 28 permits access to the interior of the housing for the purpose of performing service activities and the like in connection with the camera and other components within the housing.

Description of Base

Figure 4:
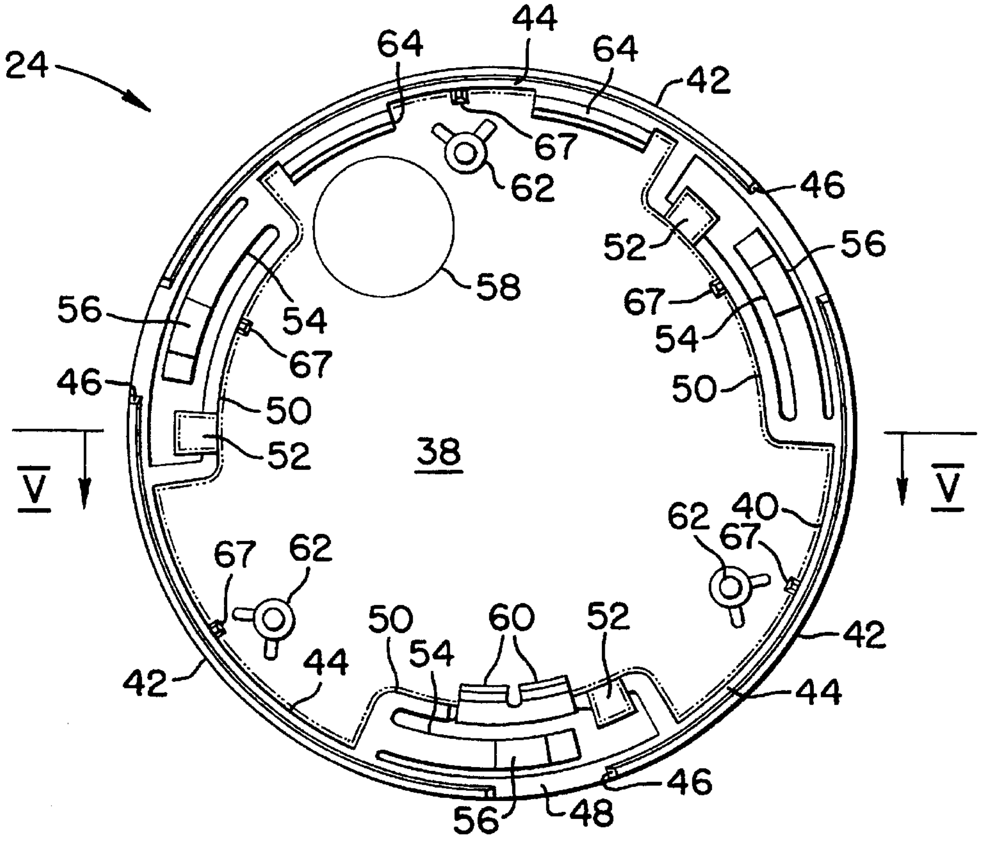
FIG. 4 is an inverted plan view of the base portion of FIG. 3.
Figure 5:
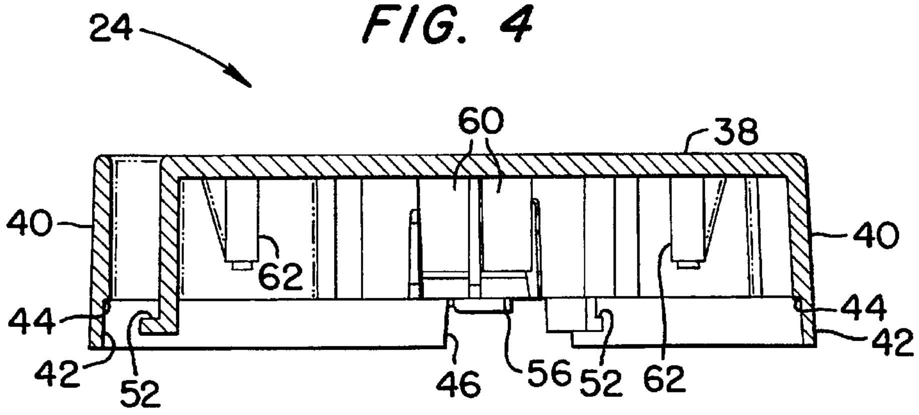
FIG. 5 is a cross-sectional view of the base portion, taken at the line V—V in FIG. 4.

The structure of the base portion 24 will now be described in some detail, with reference to FIGS. 3–5.

The base 24 is preferably formed as a single piece of molded plastic. The base 24 includes a generally flat and circular top plate 38 and a cylindrical wall 40 which extends downwardly from the circular periphery of the top plate 38. The wall 40 is extended further downwardly, over most of the circumference thereof, by three arcuate flange portions 42. The flange portions 42 have a thickness that is less than the thickness of the wall 40 (as seen, for example, from FIG. 5) and the outer surfaces of the flange portions 42 are flush with the outer surface of the wall 40, so that an inverted setback 44 is formed as a horizontal surface extending inwardly from the junction of the flanges 42 and the wall 40.

It will be observed that the flanges 42 are three in number and define therebetween three slots 46 which extend below the bottom surface 48 of the wall 40. The three slots 46 are arranged at substantially equal angular intervals of about 120° around the periphery of the base 24. In a preferred embodiment of the invention the spacing of the slots 46 (and corresponding portions of the base 24 and housing cap 30 which are discussed below) is varied from 120° by a small extent so as to define a single correct rotational orientation in which the cap 30 can be installed on the base 24. For example, two of the intervals may be 118° with the other interval then being 124°. As will be seen, the slots 46 are provided to accommodate insertion of the fingers 36 alluded to above. The bottom surface 48 of the wall 40 is flush and continuous with the setback 44 formed by the flanges 42.

In proximity to each of the three slots 46, a corresponding projecting part 50 projects downwardly from the top plate 38 of the base 24. Integrally formed with each projecting part 50 is a respective horizontal, outwardly extending shelf 52. Each shelf 52 is located a short distance inwardly from the corresponding slot 46 and, as seen in FIG. 4, a side of each shelf 52 is substantially aligned with an edge of a corresponding one of the arcuate flanges 42 so that each shelf 52 is off-set from its corresponding slot 46 in a direction viewed as counterclockwise in FIG. 4.

Figure 3:
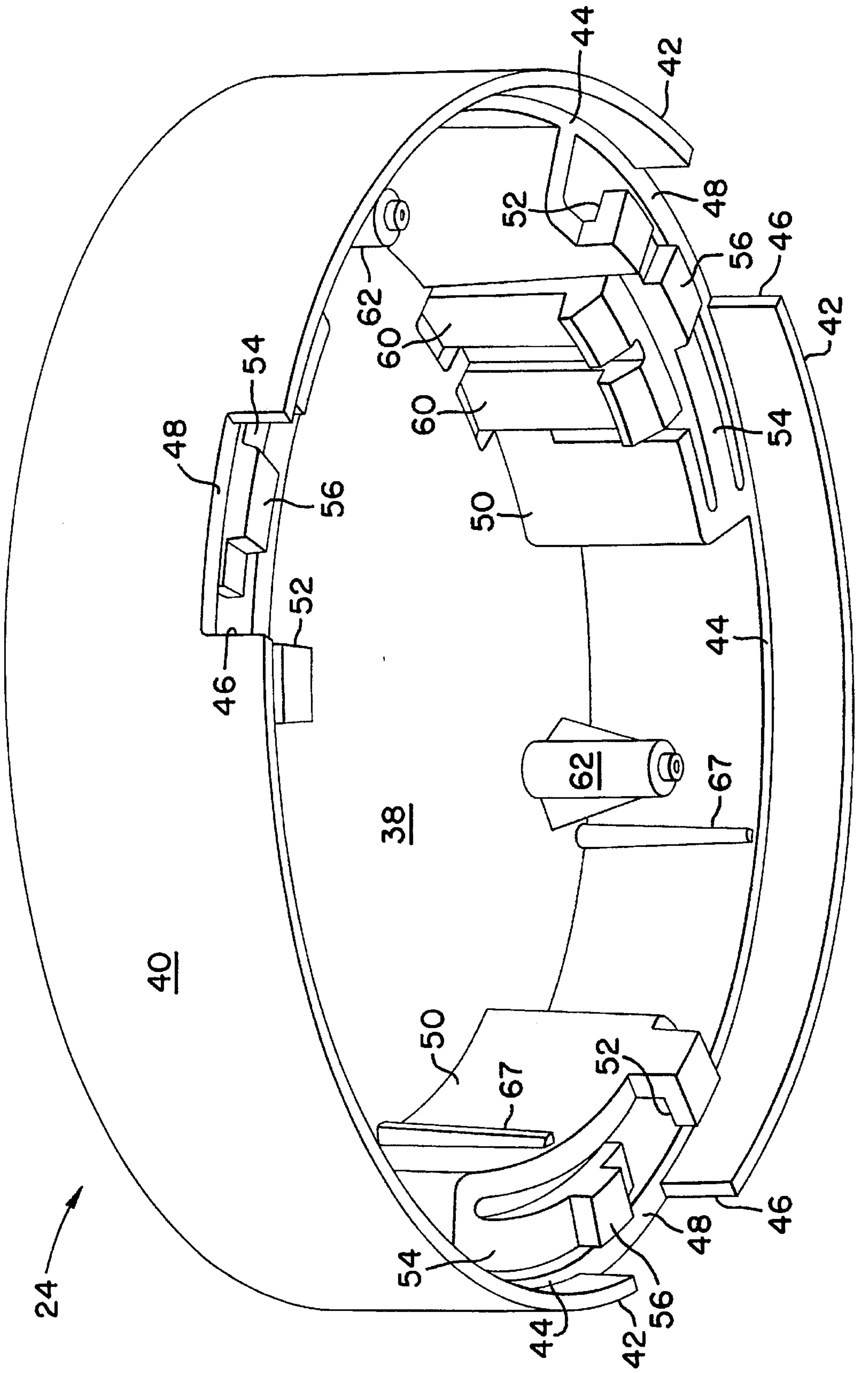
FIG. 3 is a perspective view of interior features of a base portion of the assembly of FIG. 1.

Each of the projecting parts 50 also has formed integrally therewith a respective spring clip 54, which extends generally horizontally and in a clockwise direction (as viewed in FIG. 3). Each of the spring clips is formed in an arcuate shape, as best seen from FIG. 4, and is arranged a short distance inwardly and parallel to the circumference of the base portion 24. A locking member 56 is provided on the downward side of the free end of each spring clip 54. Each spring clip 54 is positioned so that its locking member 56 is located substantially opposite, and inwardly from, a respective one of the slots 46.

As will be seen, the shelves 52 and spring clip 54 are provided for securely but releasably mounting the housing cap 30 to the base portion 24.

Other features of the base portion 24 include a rather large circular access hole 58 (FIG. 4) formed in the top plate 38 of the base portion. The access hole 58 is provided as a point of entry for power, control and video signal cabling (not shown). Also included as features of the base 24 are a pair of adjacent PCB support fingers 60, three PCB positioning bosses 62, and a pair of PCB support members 64 (FIG. 4). The elements 60, 62 and 64 are all provided to permit a printed circuit board 66 (not shown in FIGS. 3–5, see FIG. 12) to be mounted in the base 24. Reinforcing ribs 67 are also provided at appropriate locations on internal surfaces of the base 24.

Description of Housing Cap

Figure 6:
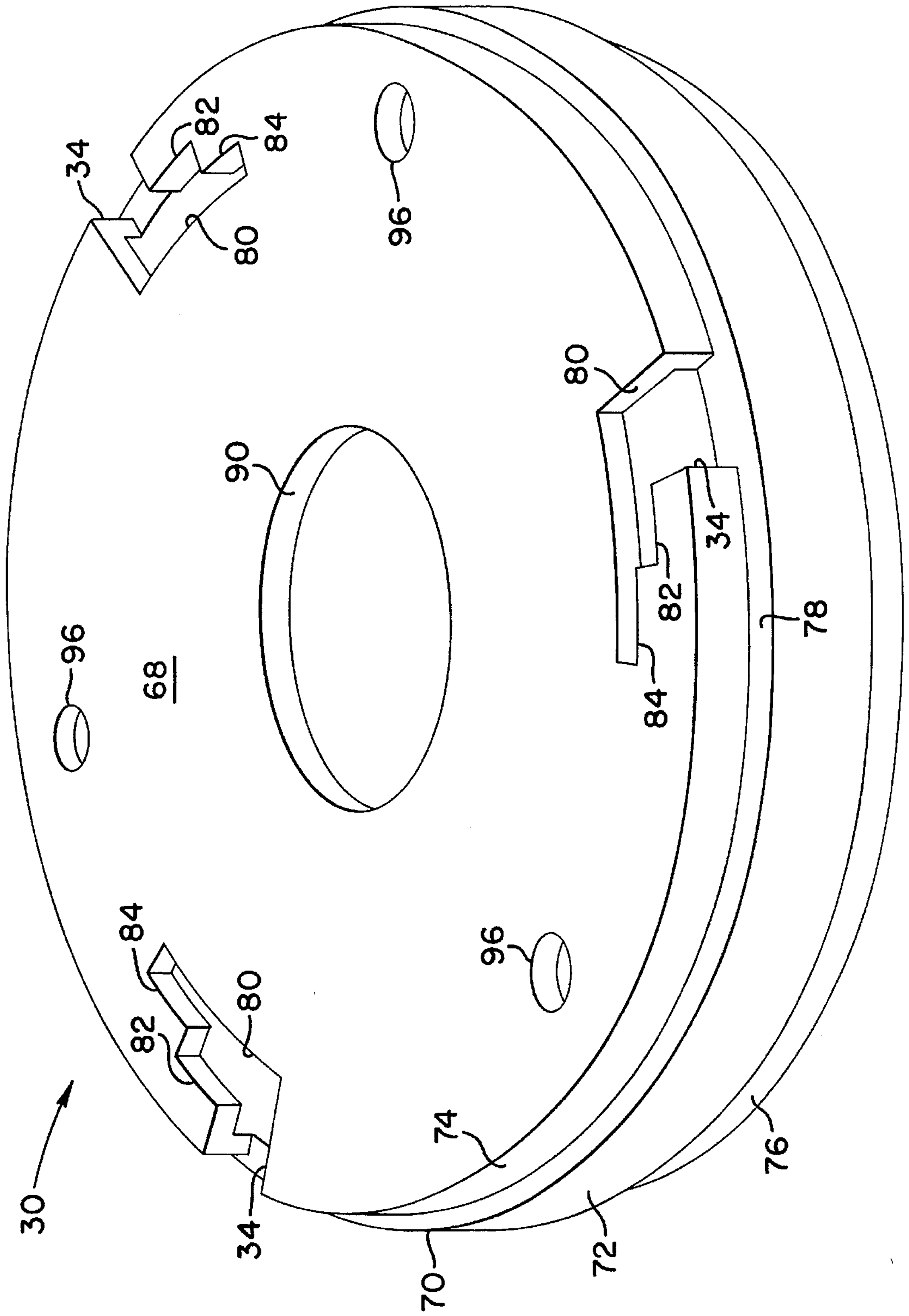
FIG. 6 is a perspective view of a housing cap portion of the camera assembly of FIG. 1.
Figure 7:
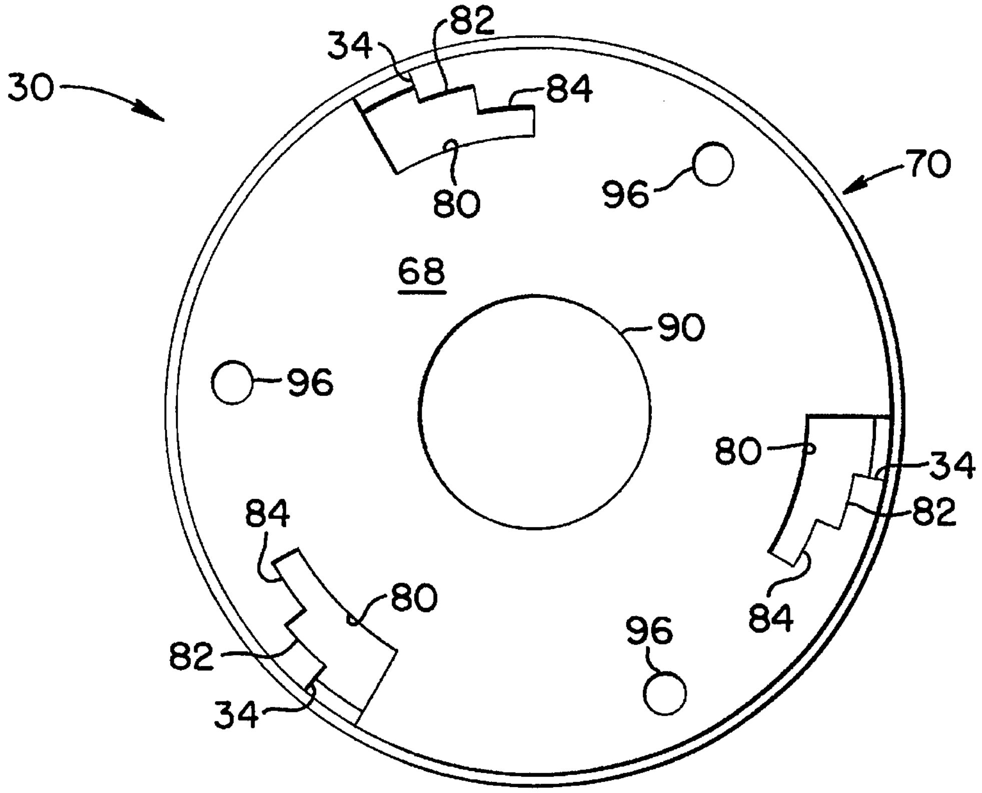
FIG. 7 is a top plan view of the housing cap of FIG. 6.

Some details of the housing cap 30 will now be described with reference to FIGS. 6 and 7.

Like the base 24, the cap 30 is generally cylindrical in shape. The cap 30 includes a top plate 68 and a cylindrical side wall 70 formed of a central portion 72 provided between an upper set-back portion 74 and a lower set-back portion 76. A ledge 78 is formed at the junction of the central wall portion 72 and the upper set-back portion 74.

The above-mentioned apertures 34 are provided in the upper set-back portion 74, and each of the apertures 34 extends upward to form a respective stepped slot 80 in the top plate 68 of the housing cap 30. Serving to partially define each slot 80 is a first cut portion 82, extending inwardly a certain distance from the perimeter of the top plate 68, and a second cut portion 84 which extends inwardly from the perimeter of the top plate by a greater distance than the cut portion 82. Like the slots 46 provided on the base 24, the apertures 34 on the cap 30 are three in number, and are equally spaced around the circumference of the cap 30.

As will be seen, the apertures 34 permit insertion through the side wall 70 of removal tool insertion fingers, and also interact with the locking spring clips 54 of the base 24. In addition, the stepped slots 80, and particularly the inwardly extending cut portions 84 of the top plate 68, are provided to interact with the outwardly extending shelves 52 of the base 24.

Other features of the cap portion 30 include a PCB holding bracket 86 (FIG. 12) which extends inwardly from the central portion 72 of the side wall 70. The holding bracket 86 is provided to permit mounting of a printed circuit board 88 (shown in FIG. 12, not shown in FIGS. 6 and 7) within the cap portion 30. A rather large circular access hole 90 (best seen in FIGS. 6 and 7) is provided at a central location in the top plate 68 of the cap 30 to permit power and signal connections between the printed circuit board 66 mounted in the base 24 and the printed circuit board 88 mounted in the housing cap portion 30. As somewhat schematically illustrated in FIG. 12, such connections may be made by means of an extender part 92 which extends downwardly from the PCB 60 and carries brushes 94 for making contact with suitable contacts (not shown) provided on the PCB 88. Preferably, the contacts on the PCB 88 are formed as concentric arcuate traces at radial positions that correspond to the respective brushes 94 of the cap 24.

Also provided in the top plate 68 of the housing cap 30 are connector access holes 96 provided to accommodate connectors (not shown) which attach the dome portion 32 of the housing 28 to the capped portion 30.

Description of Removal Tool

Figure 8:
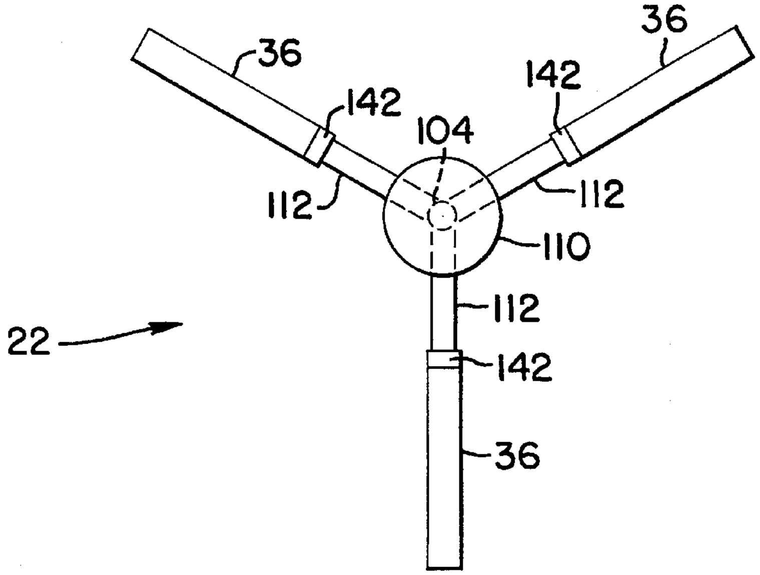
FIG. 8 is a top plan view of the housing removal tool of FIG. 1.

Features of the camera removal tool 22 will now be described, initially with reference to FIGS. 1 and 8.

At the outset, it is to be noted that in FIG. 1, for the purpose of simplifying the drawing, only two insertion fingers 36 are shown. However, a preferred embodiment of the camera removal tool 22 includes three insertion fingers 36, (as indicated in FIG. 8, which is a top plan view of the tool 22); that is, an insertion finger 36 is provided for insertion into and engagement with each one of the three apertures 34 provided in the housing cap 30. Also, as will be seen, each insertion finger 36 interacts with a corresponding one of the three spring clips 54 provided on the base 24 of the camera assembly 20.

Referring now to FIG. 1, the removal tool 22 includes a pole head 98 which is in the form of an elongate hollow cylindrical tube. The pole head 98 has an open end 100 and a closed end 102. An inner pole 104 is mounted within the pole head 98 for sliding movement within the pole head. A spring loading assembly 106 biases the inner pole 104 away from the closed end 102 of the pole head 98.

The inner pole 104 has an outer end 108 on which is mounted a cradle 110. The cradle 110 is convexly shaped so as to match the contour of the dome portion 32 of the camera assembly 20. Intermediate the cradle 110 and the open end 100 of the pole head 98, the outer end 108 of the inner pole 104 carries horizontally extending cross pieces 112 (three in number, see FIG. 8). A respective L-shaped member 114 is pivotally mounted at the end of each of the cross pieces 112. Each one of the L-shaped members 114 includes a horizontal portion which constitutes one of the above-described insertion fingers 36, as well as a relatively long vertical portion 116. It will be observed that each of the fingers 36 extends inwardly from an upper end of the vertical portion 116. Pivotally mounted to a lower end of each of the vertical portions 116 of the L-shaped members is an end of a respective link member 118. The opposite end of each link member 118 is pivotally mounted on the exterior of the pole head 98 near the open end 100 of the pole head 98.

A latching mechanism 120 is provided on the pole head 98 below the link members 118. As somewhat schematically represented in FIG. 1, the latching mechanism 120 includes a latch member 122 pivotally mounted on the pole head 98. The latch member 122 includes a lock part 124. An access hole 126 is provided in the pole head 98 at a position opposite the lock part 124 for permitting the lock part 124 to project into the interior of the pole head 98. A locking hole 128 is provided in the inner pole 104 for selectively engaging the lock part 124 of the latch member 122. A bias spring 130 is mounted on a mounting member 132 which extends outwardly from the pole head 98. The bias spring 130 is connected to the latch member 122 and biases the latch member 122 in a direction for inserting the lock part 124 into the access hole 126 and also for insertion into the locking hole 128 at times when the locking hole 128 is aligned with the access hole 126. A lengthy cord 134 is connected to the latch member 122 to permit a human operator of the tool 22 to pivot the latch member 122 against the biasing force of the bias spring 130, so as to disengage the lock part 124 from the locking hole 128.

The pole head 98 is detachably mounted on an extension pole 136 by means of a conventional mounting mechanism which is not shown. The extension pole 136 may be a conventional type of telescoping extension pole, extendable to a length of ten feet or more.

Removal of Camera Assembly Housing

Operation of the first embodiment of the invention will now be described, including, initially, a procedure for removing the housing portion 28 of the camera assembly 20 from the base portion 24.

By use of the extension pole 136 which forms part of the removal tool 22, the individual charged with removing the housing 28 from the base 24 can do so without mounting on a ladder or scaffold, even if the camera assembly is installed at a considerable distance from floor or ground level. Referring to FIGS. 1 and 2, the removal of the housing portion 28 of the camera assembly 20 is commenced by bringing each of the insertion fingers 36 into alignment with a respective one of the apertures 34 provided in the cap portion 30 of the housing 28. The cradle 110 of the removal tool 22 is then brought into contact with the bottom of the dome portion 32 of the housing 28 (making use of the extension pole), and the pole head 98 is pushed upwardly against the dome portion 32 so that the inner pole 104 is pushed down (relative to pole head 98) inside the pole head 98 and against the biasing force of the spring loading assembly 106. The downward movement of the inner pole 104 relative to the pole head 98 causes the link members 118 to pivot downwardly and outwardly as indicated by the arrows 138. The downward and outward pivoting movement of the link members 118 rotates the L-shaped members 114 so that the insertion fingers 36 are moved inwardly (as indicated by arrows 140) for insertion into the apertures 34 of the housing cap 30. When the inner pole 104 has been pushed downwardly relative to the pole head 98 by a predetermined amount, the locking hole 128 of the inner pole 104 comes into alignment with the access hole 126, so that the lock part 124 of the latch member 122 is inserted into the locking hole 128 by means of the biasing force provided by the bias spring 130, and the lock part 124 accordingly becomes engaged in the locking hole 128. The inner pole 104 is therefore locked relative to the pole head 98 and the insertion fingers 36 are also locked in an inserted position relative to the apertures 34 of the housing cap 30.

Figure 10:
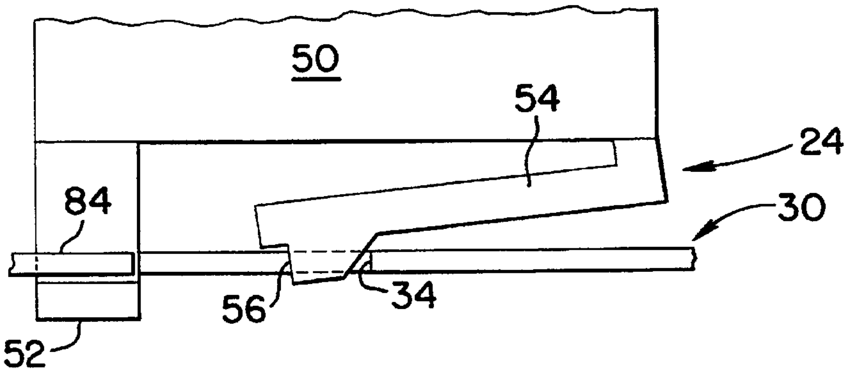
FIG. 10 is a partial side view of the camera assembly of FIG. 1, with the side walls of the base and housing cap portions removed.

FIG. 10 illustrates the condition of the housing cap 30 and the base 24 prior to insertion of the insertion fingers 36. Although not shown in FIG. 10, it should be understood that the slots 46 in base 24 are each aligned with a respective one of the apertures 34, so that the fingers 36 are inserted between the flanges 42 of the base 24. It will be observed that the cap 30 is supported on the shelves 52 of the base 24 by means of the cut portion 84 of the top plate 68 of the cap 30 (see also FIG. 6). At the same time, and continuing to refer to FIG. 10, the locking members 56 of the spring clips 54 of the base 24 are engaged with the apertures 34 of the cap 30 so as to inhibit rotation of the cap 30 relative to the base 24.

Figure 12:
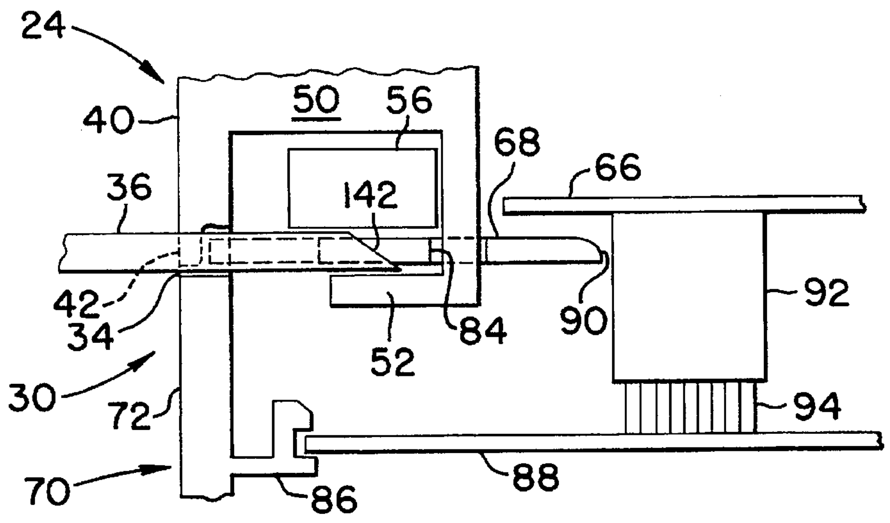
FIG. 12 is a cross-sectional view, taken at the line XII—XII in FIG. 11, of the camera assembly having the insertion finger inserted therein.

As best seen in FIGS. 12 and 2, each insertion finger 36 is tapered at its respective tip so as to form an inclined cam surface 142 at the tip of the finger. Upon the above-described insertion of the insertion fingers 36 into the apertures 34, the locking members 56 of the spring clips 54 are caused to ride upwardly on the cam surfaces 142 so that the locking members 56 are lifted clear of their respective apertures 34. The individual who is removing the housing 28 then twists or rotates the removal tool 22 around its longitudinal axis so as to rotate the cap 30 relative to the base portion 24 in the counterclockwise direction as viewed by the individual. This rotating motion is represented by the arrow 144 in FIG. 11. The rotation continues until the shelf 52 of the base 24 is in alignment with the relatively wide portion of the stepped slot 80 which corresponds to the cut portion 82 in the housing cap 30. At this time, the housing 28, which is still grasped by the insertion fingers 36 of the removal tool 22, may be removed directly downwardly from the base 24. The shelves 52 emerge from the stepped slot 80 as the housing 28 is moved downwardly.

The individual who is removing the housing 28 then manipulates the tool 22 by shifting his or her grip hand-over-hand up the extension pole 136 (or by telescoping the extension pole) until he or she is able to grasp by hand the pole head 98, by which the housing 28 remains engaged. The pole head 98 may then be detached from the extension pole 136 and the individual may pivot the latch member 122 (by pulling on the cord 134, for example) so as to unlock the inner pole 104 from the pole head 98. Upon unlocking of the inner pole 104, the spring loading assembly 106 pushes the inner pole 104 outwardly, thereby causing outward movement of the insertion fingers 36 and releasing the housing 28 from the removal tool 22. Removal of the assembly 28 is then complete.

Reinstallation of Camera Assembly Housing

There will now be described use of the tool 22 to install a housing 28 on a base portion 24 which is installed on a ceiling but does not have a housing 28 mounted thereon.

Initially, the housing 28 is mounted on the tool 22 by pushing down on the cradle 110 with the dome portion 32 of the housing until the fingers 36 of the tool are inserted in the apertures 34 and the locking hole 128 in the inner pole is engaged with the lock part 124 of the latching mechanism 120. The pole head 98 may then be attached to the extension pole 136. The tool 22 is then positioned, using the extension pole 136, so that each of the stepped slots 80, and in particular, the relatively wide portions thereof are brought into alignment with the shelves 52 of the base 24. The housing 28 is then moved directly upwardly so that the shelves 52 are inserted into the slots 80.

Figure 9:
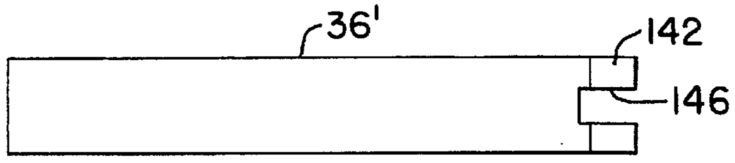
FIG. 9 is a top plan view of an insertion finger provided on the tool of FIG. 1 according to an alternative embodiment of the tool.
Figure 11:
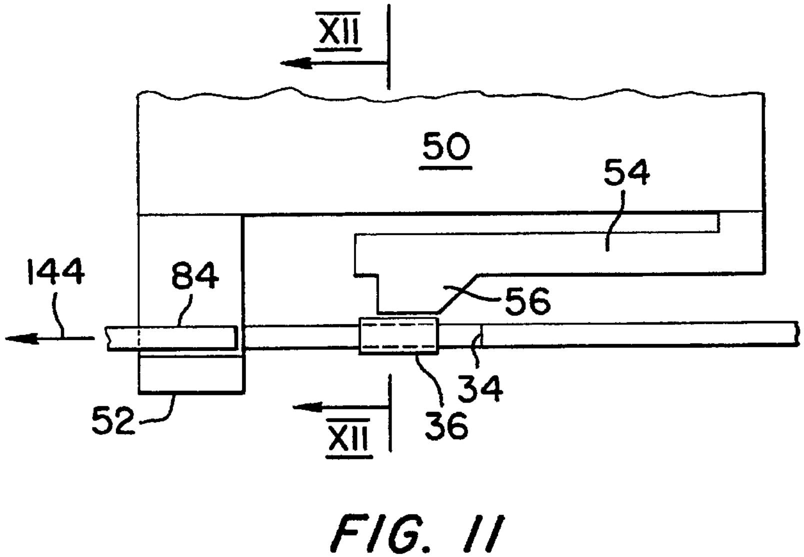
FIG. 11 is a view similar to FIG. 10, showing an insertion finger of the tool of FIG. 1 inserted in an aperture in the camera assembly housing.

Positioning of the cap 30 relative to the base 24 is aided by the flanges 42 of the base 24. The flanges 42 define an inner diameter of the base 24 which corresponds to the outer diameter of the upper set back portion 74 of the side wall 70 of the cap 30 (refer to FIGS. 3 and 6). When the cap 30 has been raised sufficiently to bring flanges 42 of the base 24 into contact with the ledge 78 on the side wall 70 of the cap 30, the tool 22 is rotated along its longitudinal axis so as to turn the housing 28 in a clockwise direction (as viewed by the individual installing the housing) so that the cut portions 84 of the housing cap 30 are positioned directly above and supported on the shelves 52 (as illustrated in FIG. 11). To complete the installation of housing 28, the cord 134 on the tool 22 is pulled so as to unlock the inner pole 104 from the pole head 98. The biasing force of the spring loading assembly 106 pushes the inner pole 104 outwardly relative to the pole head 98, thereby removing the fingers 36 from the apertures 34. This permits the locking members 56 of the spring clips 54 to move downwardly, as a result of self-biasing action by the spring clips 54, so that the locking members 56 come into engagement with the apertures 34, as shown in FIG. 10. It is contemplated to modify the first embodiment of the invention to aid in preventing unauthorized removal of camera housing. Specifically, a key slot 146 may be formed (as shown in FIG. 9) at the tip of each insertion finger (indicated by reference number 36' in FIG. 9), and a key pin (not shown) may be provided at corresponding positions in each aperture 34 of the housing cap 30, so that only a tool 22 having matching key slots can be used to remove the housing from the base.

The first embodiment of the invention, employing the above described twist-and-lock technique for installing the camera housing 28, provides a convenient and reliable system for installing and removing camera assemblies from ceilings or other installation locations that are far above floor or ground level. The provision of the removal tool 22, including the extension pole 136, allows dome removal and reinstallation to be performed without use of a ladder or scaffolding, so that relatively untrained personnel are able to carry out the procedure easily and safely. In addition, this embodiment provides manufacturing economies in that both the base 24 and housing cap 30 can be formed by molding, and the secure handling of the dome assembly permitted in this embodiment makes it unnecessary to provide the safety lanyard arrangement used in prior art dome mounting systems.

SECOND EMBODIMENT

A second embodiment of the invention will now be described with reference to FIGS. 13–17. A camera assembly provided in accordance with the second embodiment is generally indicated by reference numeral 200 in FIG. 13, and reference numeral 202 indicates a camera removal tool provided in accordance with the second embodiment.

Description of Camera Assembly

Figure 14:
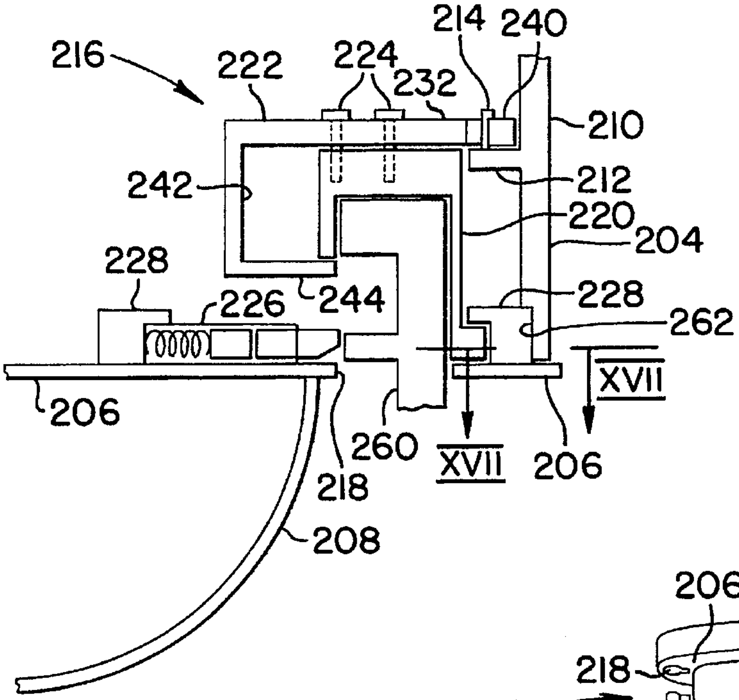
FIG. 14 is a partially schematic cross-sectional view of a locking mechanism provided in the camera assembly of FIG. 13.
Figure 13:
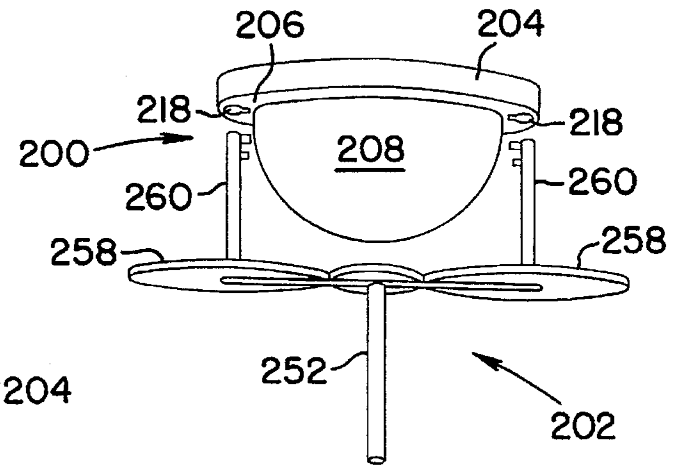
FIG. 13 is a partially schematic perspective view of a surveillance camera assembly, and a tool for removing the same, provided according to a second embodiment of the invention.

Referring to FIG. 14 as well as FIG. 13, the camera assembly 200 includes a base 204 to be fixedly mounted in a ceiling or other mounting location, a mounting plate 206 adapted for detachable installation on the base 204, and a dome portion 208 suspended from the mounting plate 206. Housed within the dome portion 208 and/or mounted on the mounting plate 206 are conventional camera dome components such as the camera itself, camera motors, and camera electronics, none of which are shown in the drawings.

Figure 15:
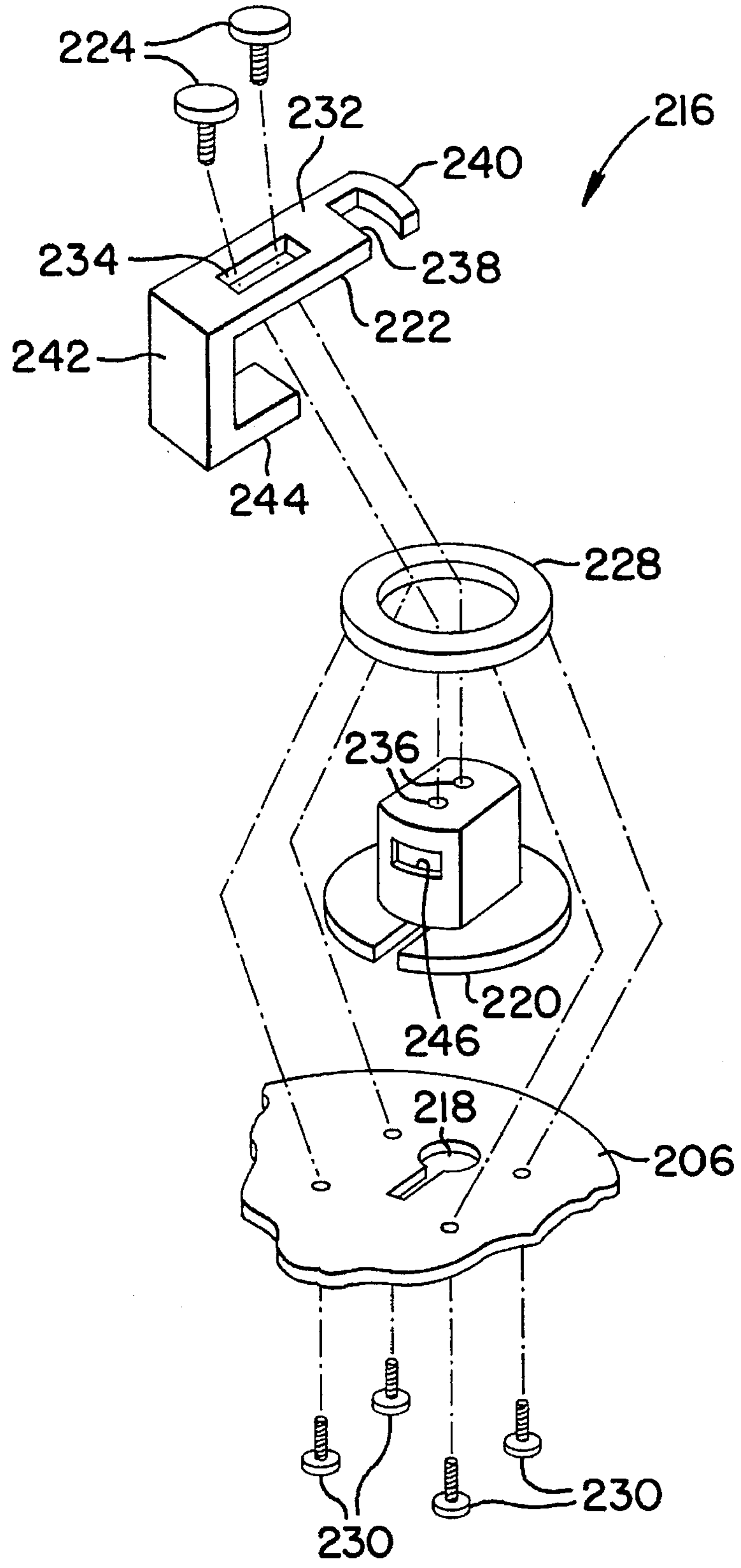
FIG. 15 is an exploded perspective view showing components of the locking mechanism of FIG. 14.

The base 204 includes a side wall 210 from which a mounting shelf 212 extends horizontally and inwardly. A latch pin 214 extends vertically upwardly from the mounting shelf 212. A plurality of lock assemblies including an exemplary lock assembly 216 shown in FIG. 14 are mounted on the top side of the mounting plate 206 to selectively lock the mounting plate to the base 204. Key holes 218 are provided in the mounting plate 206 for the respective lock assemblies. Referring to FIG. 15 in addition to FIG. 14, each lock assembly 216 includes a lock barrel 220 and a latch slide 222 slidably mounted on the lock barrel 220 by means of fasteners 224. Each lock assembly 216 also includes a tumbler assembly 226 (FIG. 14; not shown in FIG. 15). The lock barrel 220 and tumbler assembly 226 are held between the mounting plate 206 and a mounting ring 228 which is secured to the mounting plate 206 by fasteners 230 (FIG. 15).

As seen from FIGS. 14 and 15, the latch slide 222 is in general in the shape of a "J", including a relatively long horizontal top portion 232 in which a elongate slot 234 is formed extending in the longitudinal direction of the top portion 232. As indicated in the exploded rendering of the lock assembly presented in FIG. 15, the fasteners 224 are inserted through the slot 234 for insertion into mounting holes 236 provided on the top surface of the lock barrel 220. A cut-out 238 is provided at one end of the top portion 232 of the slide latch, defining a latch finger 240.

The latch slide 222 also includes a vertical member 242 which extends downwardly from the top portion 232 at an opposite end thereof from the latch finger 240. A guide member 244 is provided at the bottom end of the vertical member 242 and extends horizontally in the direction of the latch finger 240. It will be noted that the guide member 244 is substantially shorter in length than the top portion 232 of the latch slide 222. A guide opening 246 is provided in the lock barrel 220 to accommodate insertion of the guide member 244 into the guide opening 246. The guide opening 246 has a profile that substantially corresponds to a cross-section of the guide member 244. The guide member 244 and guide opening 246 cooperate, as do the slot 234 and fasteners 224, to guide the latch slide 222 for sliding motion relative to the lock barrel 220. The direction of sliding motion is defined by the long dimension of the slot 234. A cam wall 248 (FIG. 16; not shown in FIG. 14) is provided either on the mounting plate 206 or on the base 204. The cam wall 248 includes a cam surface 250 by which, as will be seen, the latch slide 222 is cammed for sliding movement during rotation of the lock barrel 220.

Description of Removal Tool

Referring again to FIG. 13, the camera removal tool 202 includes a pole head 252. A driving gear 254 is fixedly mounted on an end of the pole head 252, positioned such that the plane of the gear 254 is perpendicular to the longitudinal axis of the pole head 252, and the end of the pole head is at the center of the gear 254. A horizontal support member 256 is mounted on the pole head 252 adjacent to the driving gear 254. The support member 256 is mounted in a manner such that the pole head 252 and driving gear 254 are free to rotate, relative to the member 256, around the longitudinal axis of the pole head 252. A plurality of driven gears 258 are mounted at respective ends of the support member 256. The gears 258 are mounted for rotation on the support member 256 and are interlocked with the driving gear 254 so that the gears 258 are driven to rotate in response to rotation of the gear 254. Each of the driven gears 258 has mounted thereon a key portion 260 which extends upwardly from the center of rotation of the respective gear 258. The overall construction of the removal tool 202 is such that the spacing of the key portions 260 corresponds to the spacing on the mounting plate 206 of the key holes 218. The opposite end of the pole head 252 from the end which carries support member 256 and the driving gear 254 is provided with an attachment mechanism (not shown) by which the pole head 252 may be detachably mounted on the type of extension pole referred to in connection with the first embodiment of the invention.

Dome Removal Procedure

A procedure in which the camera dome is removed from the base 204 using the removal tool 202 will now be described, with reference to FIGS. 13, 14 and 16.

Initially, the individual charged with removing the dome rotates the pole head 252 relative to the support member 256 until the key portions 260 are properly oriented to correspond to the orientations of the key holes 218. In the embodiment shown in FIG. 13, the proper orientation of the key portions 260 is pointed inwardly, that is toward the pole head 252.

Next, the pole head is mounted on an extension pole (not shown) and the key portions 260 are presented to the key holes 218 as shown in FIG. 13. Then the key portions 260 are inserted in the key holes 218 so that each key portion 260 comes into engagement with a corresponding one of the lock barrels 220 (FIG. 14). The pole head 252 is then rotated (by suitable manipulation of the extension pole) so that the key portions 260 are rotationally driven via the driving gear 254 and the driven gears 256, to rotate the lock barrels 220. It will be understood that each key portion 260 is shaped to interact with the tumbler assembly 226 (FIG. 14) so that the lock barrel 220 is susceptible to being rotationally driven by the key portion 260. The rotation of the lock barrel 220 causes the slide latch 222 to be moved from a locked position (indicated in phantom at reference numeral 222' in FIG. 16), in which the latch finger 240 engages the latch pin 214, to an unlocked position (indicated by the solid line representation of latch slide 222 in FIG. 16), in which the latch slide 222 is clear of both the latch pin 214 and the mounting shelf 212 of the base 204. The movement of the latch slide 222 from the locked position to the unlocked position is carried out both by rotation of the latch slide 222 with the lock barrel 220 and by a camming action brought about by interaction of the latch slide 222 with the cam surface 250 in response to the rotation of the latch slide 222.

Figure 16:
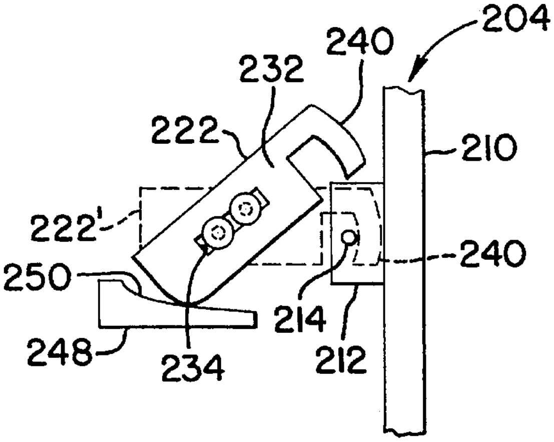
FIG. 16 is a top plan view of the locking mechanism of FIG. 14, showing locked and unlocked positions of the locking mechanism.

At the time when the latch slide 222 is in its unlocked position shown in FIG. 16, the key portion 260 is engaged by the lock barrel 220 in a manner such that the key portion 260 cannot be withdrawn from the lock barrel 220. At the same time, since the latch slide 222 is free of the locking portions of the base 204, the dome can be removed from the base 204 simply by being drawn downward on the removal tool 202.

As in the first embodiment, the extension pole can be handled so that the individual removing the dome can grasp by hand the pole head 252 and the dome portion 208 and the extension pole can then be detached from the pole head. Then the pole head 252 is rotated to rotate the key portions 260 into appropriate orientations for removal from the lock barrels 220 and withdrawal from the key holes 218. Removal of the dome is then complete.

Dome Reinstallation Procedure

Next there will be described a procedure for mounting a dome on a base 204.

Figure 17:
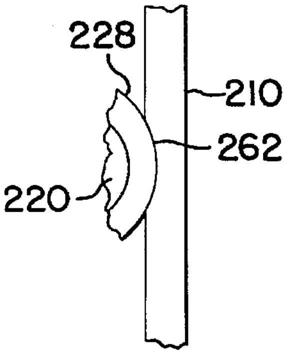
FIG. 17 is a cross-sectional plan view of part of the locking mechanism of FIG. 14, taken at the line XVII—XVII in FIG. 14.

First, the removal tool 202 is manipulated (by rotating pole head 252 relative to the support member 256), to properly orient the key portions 260 for insertion into the key holes 218. Then the key portions are inserted into the key holes and are rotated to rotate the lock barrels 220 and move the slide latches 222 to "unlocked" positions, which correspond to positions of the lock barrels 220 in which the lock barrels 220 firmly engage the key portions 260. The dome is now secured via the key portions 260 to the tool 202, which can be attached to an extension pole used for lifting the dome up into contact with the base 204. As indicated in FIGS. 17 and 14, recesses 262 formed in the side wall 210 of the base 204 cooperate with the mounting rings 228 on the mounting plate 206 to guide the dome into a proper rotational relationship with the base 204. It will be noted that the rings 228 are positioned on the mounting plate 206 to provide an effective width of the dome assembly at the elevation of the mounting rings 228 that is greater than the inner diameter of the base 204, unless the mounting plate is positioned to align the rings 228 with the recesses 262.

With the dome properly positioned, the pole head 252 is rotated (by suitable manipulation of the extension pole) to rotate the key portions 260 so as to place the lock assemblies 216 in a locked condition. That is, the lock barrels 220 are rotated by the key portions 260 so that the latch slide 222 is moved from its unlocked position (shown with solid lines in FIG. 16) to its locked position (shown in phantom at 222' in FIG. 16). (The engagement of the rings 228 by the recesses 262 prevents the dome from rotating relative to the base during rotation of the pole head.) The rotation of the latch slide 222 imparted by rotation of the lock barrel 220 is accompanied by sliding of the latch slide 222 in the leftward direction relative to the lock barrel 220 by camming action provided by contact of the latch slide 222 with the side wall 210 of the base 204. As the latch slide 222 is brought into its locked position with the latch finger 240 engaging the latch pin 212, the key portions 260 reach a rotational position in which the same can be withdrawn from the lock barrel 220 and from the key holes 218. At this point, the camera dome is supported on the shelves 212 of the base by means of the latch slides 222, and installation of the dome on the base 204 is complete.

Like the first embodiment, the second embodiment allows for safe, efficient and secure removal and reinstallation of the dome, and eliminates the need for the safety lanyard provided in prior art devices. A particular advantage of the second embodiment is that, during removal of the dome, the locking mechanism which secures the dome to the base is not released until after the dome is securely engaged by the removal tool. Thus the dome is securely held at all times either by the base or the removal tool. Also during reinstallation of the dome, either the tool or the base securely holds the dome at all times.

The second embodiment has been shown as including two lock assemblies 216 on the mounting plate and two key portions 260 on the removal tool. However, it is contemplated to include a larger or smaller number of lock assemblies on the mounting plate 206, with a corresponding number of key portions on the removal tool 202.

By the same token, the first embodiment of the invention may be altered to provide a smaller or larger number of locking arrangements than the three locking arrangements shown therein.

Various changes to the foregoing dome removal and installation system, and modifications in the described practices, may be introduced without departing from the invention. The particularly preferred methods and apparatus are thus intended in an illustrative and not limiting sense. The true spirit and scope of the invention is set forth in the following claims.

What is claimed is:

1. Apparatus for releasably locking a surveillance camera assembly housing to a base for said housing, comprising:

first means provided on said housing for engaging a tool used for removing said housing from said base, said first means including a plurality of apertures in said housing provided spaced apart from each other at respective positions on said housing, each of said apertures for receiving a respective portion of said tool; and second means mounted on at least one of said housing and said base for releasably securing said housing to said base, said second means including a plurality of lock members provided on said base at respective positions corresponding to the positions of said apertures on said housing.

2. Apparatus according to claim 1, wherein said lock members are movable by said tool from a first position, in which said lock members secure said housing to said base, to a second position such that said housing is at least partially released from said base.

3. Apparatus according to claim 2, wherein said lock members are locking clips mounted on said base and biased downwardly towards said first position, said tool acting to move said locking clips upwardly from said first position to said second position.

4. Apparatus according to claim 3, wherein each of said apertures is formed in a side wall of said housing, and said locking clips engage said apertures when said locking clips are in said first position.

5. Apparatus according to claim 4, wherein each of said apertures includes a stepped slot formed in a top wall of said housing.

6. Apparatus for releasably locking a surveillance camera assembly housing to a base for said housing, comprising:

first means provided on said housing for engaging a tool used for removing said housing from said base; and second means mounted on at least one of said housing and said base for releasably securing said housing to said base;

wherein said tool has a plurality of key portions, and said first means includes a plurality of lock barrels mounted on said housing, each for engaging a respective one of said plurality of key portions of said tool.

7. Apparatus according to claim 6, wherein said second means includes a plurality of latch slides, each associated with a respective one of said lock barrels for sliding movement in response to rotational movement of the respective lock barrel.

8. Apparatus according to claim 7, wherein said second means further includes a plurality of latch pins mounted on said base, each for engaging a respective one of said latch slides.

9. A method of removing a surveillance camera assembly housing from a base on which the assembly housing is lockingly mounted, the method comprising the steps of:

engaging said housing with a tool for removing said housing from said base; and releasing a locking mechanism which secures said housing to said base;

wherein said housing is secured to said tool before said locking mechanism is released.

10. A method according to claim 9, wherein said engaging and releasing steps are performed at least partially simultaneously.

11. A method according to claim 9, wherein said engaging step includes inserting a portion of said tool into said housing so that said portion of said tool is engaged by an aperture provided in said housing.

12. A method according to claim 11, wherein said releasing step includes rotating said housing relative to said base to a position in which an opening provided in said housing is aligned with a locking shelf provided on said base.

13. A method according to claim 9, wherein said engaging step includes inserting a key portion provided on said tool into a lock barrel portion provided on said housing.

14. A method according to claim 13, wherein said releasing step includes sliding a latch slide provided on said housing so as to disengage said latch slide from a latch pin provided on said base.

15. A method of installing a surveillance camera assembly housing on a mounting base, comprising the steps of:

engaging said housing with an installation tool;

lockingly mounting said housing on said mounting base by manipulating said installation tool by which said housing is engaged; and disengaging said installation tool from said housing;

wherein said mounting step includes placing a locking mechanism provided on at least one of said housing and said base in a locked condition, and said disengaging step is prevented unless said locking mechanism is in said locked condition.

16. A method according to claim 15, wherein said engaging step includes inserting a portion of said installation tool into said housing so that said portion of said tool is engaged by an aperture provided in said housing.

17. A method according to claim 16, wherein said mounting step includes rotating said housing relative to said base to a position in which a portion of said housing is supported on a shelf provided on said base.

18. A method according to claim 15, wherein said disengaging step includes releasing a locking catch provided on said installation tool.

19. A method according to claim 15, wherein said engaging step includes inserting a key portion provided on said installation tool into a lock barrel portion provided on said housing.

20. A method according to claim 19, wherein said mounting step includes sliding a slide latch provided on said housing so that said slide latch engages a latch pin provided on said base.

21. A tool for removing a surveillance camera assembly housing from a base on which the assembly is mounted, comprising:

a pole portion; and at least one insertion portion, mounted on said pole portion and adapted to engage said housing by being inserted into an opening provided in said housing.

22. A tool according to claim 21, wherein said at least one insertion portion includes a plurality of key portions adapted for being inserted into lock barrels provided on said housing.

23. A tool according to claim 22, further comprising:

a support member mounted on said pole portion so that said pole portion is rotatable relative to said support member;

a plurality of key-holding members rotatably mounted on said support member, each of said key-holding members having a respective one of said key portions mounted thereon; and a drive member mounted for rotation with said pole portion and engaged with said key-holding members for rotatively driving said key-holding members upon rotation of said pole portion relative to said support member.

24. A tool according to claim 21, further comprising:

a cradle adapted for being brought into contact with a convex lower surface of said camera assembly housing, said cradle being mounted on said pole portion for movement relative to said pole portion in a direction parallel to a longitudinal axis of said pole portion; and link means for linking said cradle to said at least one insertion portion so that said at least one insertion portion is moved in a direction substantially orthogonal to said longitudinal axis of said pole portion in response to said movement by said cradle in a direction parallel to said longitudinal axis of said pole portion.

25. A tool according to claim 21, wherein said pole portion has an open end and a second end opposite said open end, and is hollow from said open end along at least part of a length extent of said pole portion; and said at least one insertion portion includes a plurality of L-shaped members each including a horizontal part and a vertical part substantially longer than the horizontal part; and further comprising:

an inner pole mounted in said hollow part of said pole portion for movement relative to said pole portion in a direction parallel to a longitudinal axis of said pole portion, said inner pole extending outwardly from said open end of said pole portion and having a first end located outboard from said open end of said pole portion;

means for biasing said inner pole in a direction from said second end of said pole portion towards said open end of said pole portion;

a cradle mounted on said first end of said inner pole, said cradle having a concave shape adapted for supportingly contacting a convex lower surface of said camera assembly housing;

a crossbar on said inner pole intermediate said cradle and said open end of said pole portion, said crossbar having opposite ends each pivotally linked to the vertical part of a respective one of said plurality of L-shaped members; and a plurality of link members, each having a first end pivotally linked to said pole portion and a second end pivotally linked to the vertical part of a respective one of said plurality of L-shaped members.

26. A tool according to claim 25, further comprising latch means for selectively locking said inner pole to said pole portion.

27. A tool according to claim 21, wherein said pole portion includes a telescoping part and a head part selectively mountable on said telescoping part, said at least one insertion portion being mounted on said head part.

28. A tool according to claim 27, wherein said telescoping part is selectively extendable to a length in excess of ten feet.

29. A surveillance camera mounting system, comprising:

a base mounted on a support structure;

a surveillance camera assembly housing for being removably mounted on said base;

a tool for removing said housing from said base;

first means provided on said housing for engaging said tool, said first means including a plurality of apertures in said housing provided spaced apart from each other at respective positions on said housing, each of said apertures for receiving a respective portion of said tool; and second means mounted on at least one of said housing and said base for releasably securing said housing to said base, said second means including a plurality of lock members provided on said base at respective positions corresponding to the positions of said apertures on said housing.

30. A surveillance camera mounting system according to claim 29, wherein said lock members are movable by said tool from a first position, in which said lock members secure said housing to said base, to a second position such that said housing is at least partially released from said base.

31. A surveillance camera mounting system according to claim 30, wherein said lock members are locking clips mounted on said base and biased downwardly towards said first position, said tool acting to move said locking clips upwardly from said first position to said second position.

32. A surveillance camera mounting system according to claim 31, wherein each of said apertures is formed in a side wall of said housing, and said locking clips engage said apertures when said locking clips are in said first position.

33. A surveillance camera mounting system according to claim 32, wherein each of said apertures includes a stepped slot formed in a top wall of said housing.

34. A surveillance camera mounting system, comprising:

a base mounted on a support structure;

a surveillance camera assembly housing for being removably mounted on said base;

a tool for removing said housing from said base;

first means provided on said housing for engaging said tool; and second means mounted on at least one of said housing and said base for releasably securing said housing to said base;

wherein said tool has a plurality of key portions, and said first means includes a plurality of lock barrels mounted on said housing, each for engaging a respective one of said plurality of key portions of said tool.

35. A surveillance camera mounting system according to claim 34, wherein said second means includes a plurality of latch slides, each associated with a respective one of said lock barrels for sliding movement in response to rotational movement of the respective lock barrel.

36. A surveillance camera mounting system according to claim 35, wherein said second means further includes a plurality of latch pins mounted on said base, each for engaging a respective one of said latch slides.

* * * * *